G. DE WATTRIPONT.
STACKER.
APPLICATION FILED APR. 25, 1910.
988,682.
Patented Apr. 4, 1911.
3 SHEETS—SHEET 1.
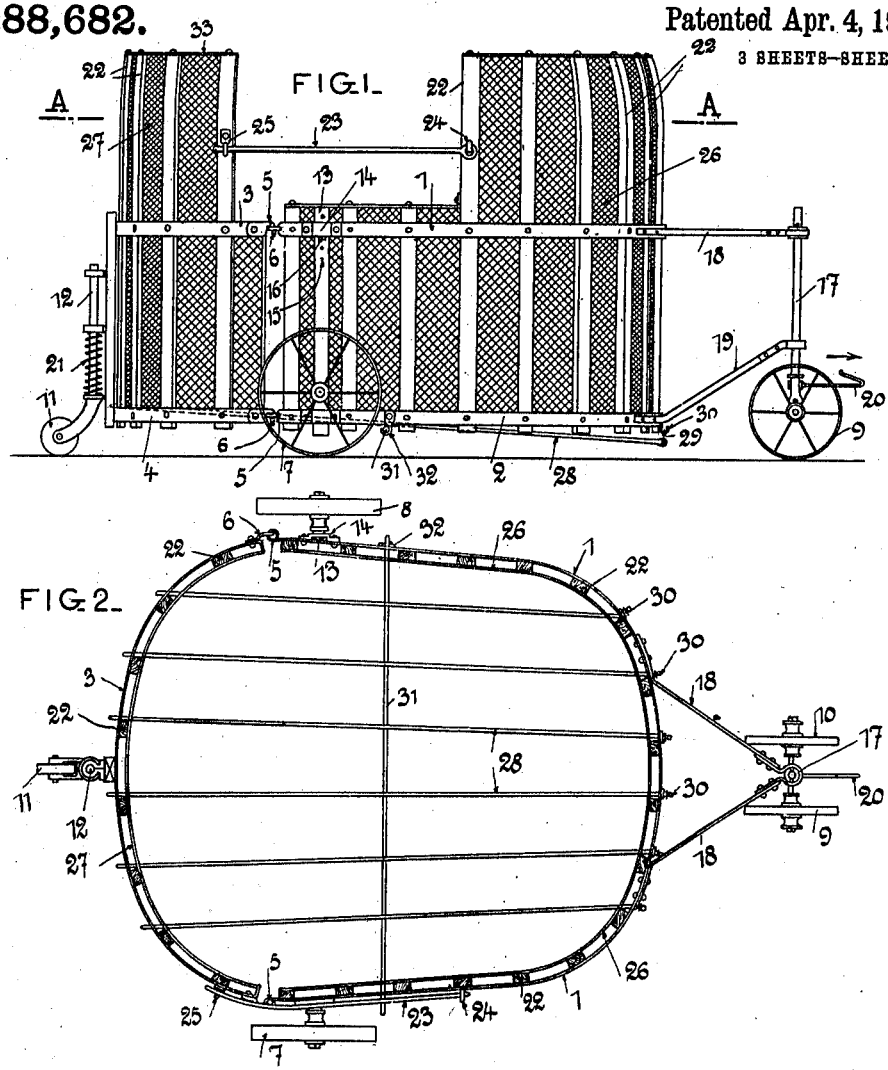
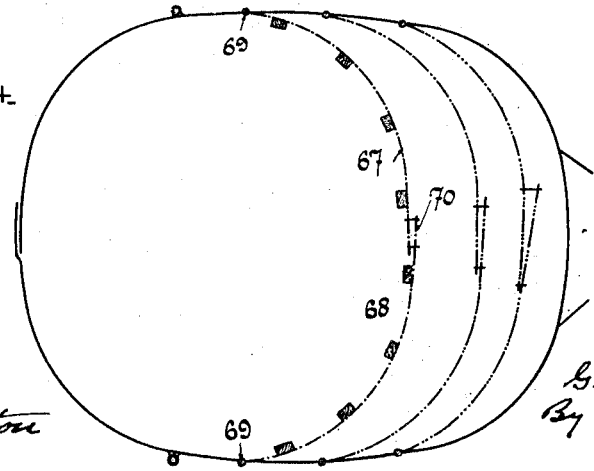

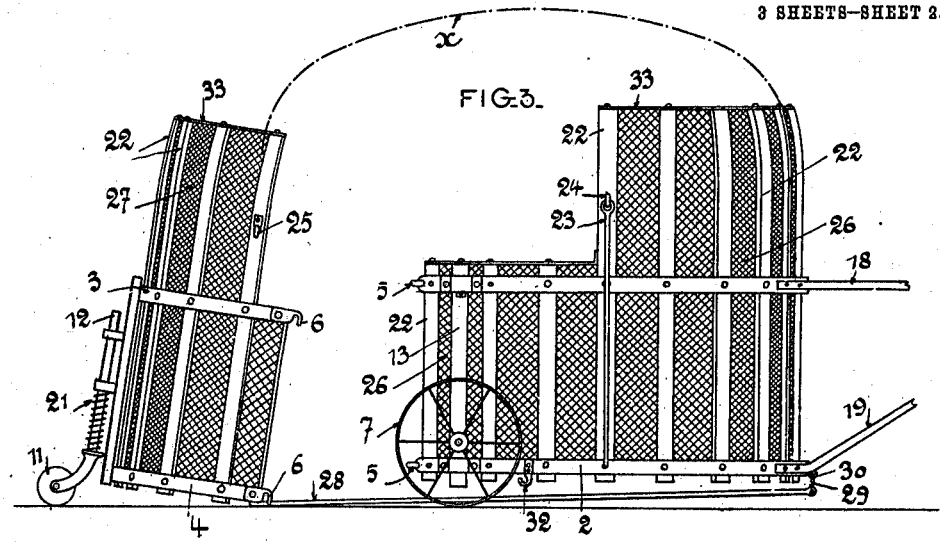

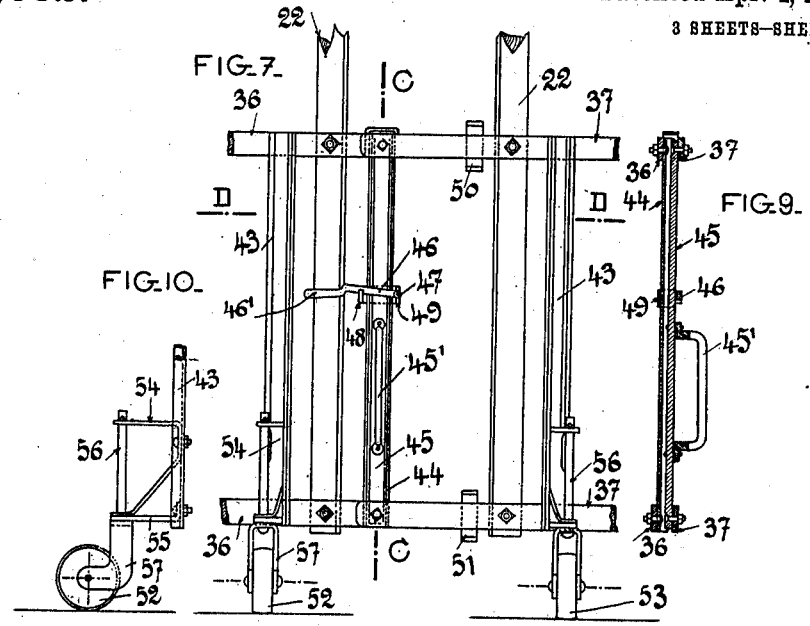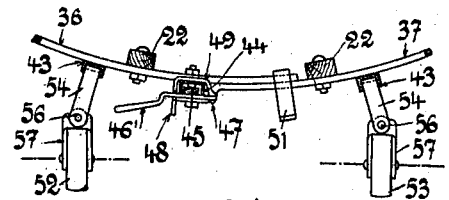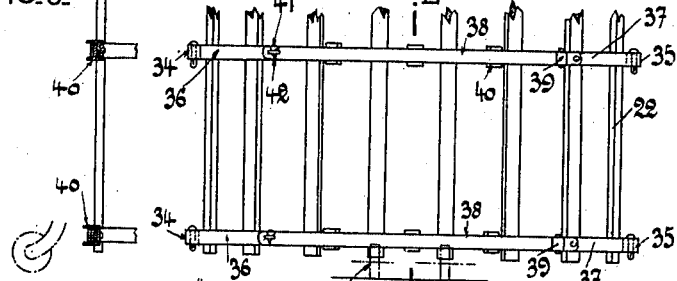

UNITED STATES PATENT OFFICE.

GEORGES DE WATTRIPONT, OF ROISSY-EN-BRIE, FRANCE.

STACKER.

988,682. Specification of Letters Patent. Patented Apr. 4, 1911.

Application filed April 25, 1910. Serial No. 557,404.

*To all whom it may concern:*

Be it known that I, GEORGES DE WATTRIPONT, agriculturist, citizen of the Republic of France, residing at Roissy-en-Brie, in the Department of Seine-et-Marne and Republic of France, have invented certain new and useful Improvements in Stackers, of which the following is a specification.

The present invention has for its object the construction of a stacker for forming haycocks.

In accordance with the ordinary hand method, the mown hay or the like is spread upon the ground and turned until it is dry. It is then made into small heaps called "cocks," at greater or less intervals apart and more or less regular. Finally, the hay is made into a rick, that is to say the small heaps or cocks already referred to are combined until a rick of the desired size has been formed. Now it will be understood that the formation of such ricks necessitates the laborers passing continually backward and forward in the radius of the rick in order to collect the scattered cocks and bring it to the rick in the process of formation. This work occupies a long time and is consequently costly.

In accordance with the present invention the transport device is adapted to be drawn between two rows of small heaps or cocks of hay or the like previously formed, so that two men, one on each side of the cart have only to collect the hay and throw it into the device as it advances, until it is sufficiently full. The hay is removed from the hay receptacle of the transport device, that is to say by a readily effected operation the large cock formed which is shaped by the receptacle is deposited upon the ground while the transport device is moved along between two fresh rows of cocks for forming a fresh cock.

The invention is illustrated in the accompanying drawing in which:—

Figure 1 is a side view of the device embodying the invention. Fig. 2 is a sectional plan on the line A—A in Fig. 1. Fig. 3 is a view showing the device during the discharge of a completed cock. Figs. 4, 5 and 6 show in elevation, plan and cross section on the line B—B respectively, a modification of the rear portion. Fig. 7 shows another modification of the rear portion; Fig. 8 is a horizontal section on the line D—D in Fig. 7, and Fig. 9 is a vertical cross section on the line C—C. Fig. 10 illustrates a means for mounting one of the rear wheels. Figs. 11 and 12 show in side elevation and in sectional plan on the line F—F respectively, the framework of a device comprising various modifications. Fig. 13 is a section to a larger scale on the line E—E in Fig. 11, and Fig. 14 is a diagrammatic view illustrating a method of forming cocks of different sizes with the same receptacle.

In the drawing like reference numerals indicate like parts.

Referring to Figs. 1, 2 and 3 it will be seen that the framework of the device is formed of two iron bands 1 and 2 arranged horizontally and parallel with each other, with which, at the rear and in the same planes, two bars 3 and 4 are connected by means of eyes 5 in which engage hooks 6 on the ends of the bars 3 and 4; these bars thus constitute a detachable part.

As shown in Fig. 2 the form of the device and consequently of the receptacle or mold is oval and preferably narrower at the front than at the rear in order to facilitate the removal of the large haycock when formed, as will be explained.

The bars 1 and 2 are supported by the side wheels 7 and 8 and by the wheels 9 and 10 of the fore carriage, while the rear bars 3 and 4 are connected with a caster 11 rotatable around the spindle 12. Each side wheel is mounted upon a vertical bar 13 guided in two fittings 14 secured to the bars 1 and 2 respectively. These bars 13 are perforated with a number of holes 15 to permit of adjusting the height of the frame according to circumstances. Bolts 16 are adapted to engage in one of these holes (see Fig. 1) upon which the upper bar 1 rests.

In accordance with a well-known mechanical construction, the wheels 9 and 10 of the fore carriage are connected with the vertical rod 17 rotating freely in sockets in the arms 18 and 19 fixed to the frame members 1 and 2. A hook 20 serves for connecting means thereto for drawing the device. Finally, the rear caster 11 is combined with a spring 21 adapted to absorb shocks.

Vertical uprights 22, preferably of wood, are secured internally to and suitably spaced upon the frame formed by the iron bars 1, 2, 3 and 4. The height of these uprights is determined by the height of the cock which it is desired to form. At their upper part the said uprights 22 are slightly curved toward the interior in order to facilitate the dome-formation that it is preferable to impart to the cock. Each of the uprights 22 is bolted to the bars 1, 2, 3 and 4. Fig. 1 shows that laterally, and on each side of the carriage 3, these uprights 22 are shorter than the other in order to provide a vacant space through which the laborer can load the cart as it advances. However, when the cock in process of formation has reached a certain height it is supported on either side by an iron bar 23 pivoted at 24 and engaging in a support 25 fixed to one of the rear uprights 22.

In order to reinforce the framework constituted by the iron bars 1 and 2, 3 and 4, they may be stayed by means of transverse metal members arranged crosswise. As shown in the drawing the metal gratings 26 and 27 are arranged internally throughout the entire height of the uprights 22 in order to support the hay or the like and facilitate the removal of the large cock when formed.

The apparatus is completed by a certain number of longitudinal rods 28 suspended at one of their ends by a link 29 which is hooked to a hook 30 fixed to the bar 2. The other end of the rods 28 rests upon the lower rear bar 4. These rods 28 likewise rest, at the median part of the cart, upon a cross bar 31 engaged with two hooks or supports 32 secured outside the bar 2. Finally, the vertical uprights 22 may be connected at their upper parts by a flat bar 33.

The apparatus described above operates in the following manner:—Referring to Figs. 1 and 2 it will be seen that the transport device is ready for use, except that the bar 23 should not be secured in the position shown, as already stated, until the hay cock has reached a certain height. The device shown in Fig. 1 is brought between two rows of small hay-cocks and the hay thrown therein. This hay falls onto the longitudinal rods 28 which constitute a temporary floor. In proportion as it is loaded the transport device is advanced so that the laborers have only to keep along with it. When the hay receptacle is full, that is to say when the cock is finished, as shown by the line $x$ in Fig. 3, it is removed at the selected spot. In order to effect this operation the cross bar 31 is first released and then, by means of a lever, the rear of the cart formed by the bars 3 and 4 and their vertical uprights is lifted until the hooks 6 are disengaged from the eyes 5; the rear of the receptacle is then separate from the front portion. Consequently if the front portion is drawn forward, it carries with it the mass of hay and the latter leaves the rear part which remains in its detached position and inclines toward the ground as shown in Fig. 3. At the moment at which this separation takes place the longitudinal bars 28 carried along by the cart leave the bar 4 on which their ends rested and fall to the ground thereby resting in an inclined position resulting from the manner in which they are suspended. This movement results in detaching the cock to some extent and, as it is no longer retained and the cart continues to advance, it becomes all the more readily detached as the front of the cart is narrower than the rear. The cock therefore remains on the ground in the condition in which it was formed and without necessitating any additional labor. The cart having advanced the proper distance the bars 28 are withdrawn from beneath the cock and it only remains to re-assemble the apparatus in order to proceed for the formation of a fresh cock.

In the modification of the invention illustrated in Figs. 4, 5 and 6, two doors are provided in the rear part of the apparatus instead of forming this part as a detachable unit. In this arrangement the horizontal bars 1 and 2 are connected by the hinge members 34 and 35 above and below to the bars 36 and 37 which unite at the median rear part of the receptacle and carry the wooden uprights 22. To provide for closing securely, a flat bar 38 is hinged at 39 to each of the bars 37 the other ends of said bar 38 engaging U-shaped irons 40, three of which for example may be provided on the bars 37. Finally, the end of the bars 38 is slotted for the reception of a bolt 41 for locking the said bars in place; this bolt is riveted upon the bar 36 and receives a locking key 42.

In use it is only necessary to open the doors in order to remove the cock in its molded form in the manner already explained.

The modification of the invention illustrated in Figs. 7 to 10 comprises another arrangement of the doors on the rear part of the cart. The rear part, like that in the modification just described, comprises two bars 36 on one side and two bars 37 on the other side, these bars being respectively connected by the wooden uprights 22 and by U-shaped irons 43; as in the preceding arrangement they are pivoted. In accordance with this modification the bars 36 are likewise stayed toward the axial part of the cart by another U-shaped iron 44 in which, upon closing, a flat iron bar 45 on the end of the bars 37 is engaged. In addition, in order to hold this bar 45 in its housing, locking is effected by means of a latch 46 pivoting at 47 and engaging in a staple 48 formed by a fitting 49 secured to the U-shaped bar 44. The latch 46 terminates in a handle 46' for facilitating the locking operation. Flared yokes 50 and 51 may be secured to the bars 36 for guiding the bars 37 on closing. Finally the flat bar 45 is provided with a handle 45' for opening and closing. In this modification the transport device may be provided at the rear with two casters 52 and 53.

Fig. 10 shows more particularly the means for mounting one of these casters or rear wheels. In this view it will be seen that the stays 43 serve to support the arms 54 and 55 in which engages the shaft 56 around which the fork 57 in which the caster is mounted is able to turn so that the caster may assume any suitable position.

In Figs. 11 and 12 a modification in the means for operating the cross bar 31 supporting the rods 28 is illustrated. In accordance with this arrangement on each side of the cart the bar 31 is supported by a chain 58 the uppermost link of which engages with the end of a lever 59 pivoted at 60 and acted upon by the weight of the bars 31 and 28 in such a manner that it tends to rise as shown by the arrow y. In order to hold the lever in the desired position it carries a stop 61 fitting over the bar 2 as shown in Fig. 13. When it is desired to release the bar 31 the stop 61 is disengaged by downward pressure and the bars 31 and 28, owing to their weight, cause the lever 59 to pivot so that it occupies the position shown in broken lines in Fig. 11 and the chain 58 and the bar 31 are released, the latter falling to the ground.

Fig. 11 shows that the bars 28, instead of resting upon the bars 36 and 37 as in the foregoing figures, are each suspended from a hook 62 secured to the bar 4 so that when the rear of the carriage is detached from the front, as stated above with reference to Figs. 1, 2 and 3, or when the doors are opened as in the modifications illustrated in Figs. 4, 5, 6 and 7 to 10, the rods 28 are displaced and leave their supporting hooks 62.

Figs. 11 and 12 illustrate a construction of the front part of the transport device devised in order to reduce its width to enable it to pass along a narrow lane for example. For this purpose the lateral members 1 and 2 are connected by joints 63 and 64 to front bars 65. In order to lock these joints the bars 18 of the fore carriage, Fig. 12, are fixed by their bent ends 18' to the front bars 65 and also to the bars 1 and 2 by means of bolts and nuts 66 (see the plan view Fig. 12). When it is desired to reduce the width of the cart the nuts 66 are removed, thus enabling the lateral bars to pivot around the hinges 64 as shown in broken lines.

Finally, Fig. 14 shows diagrammatically the manner in which an internal framework can be employed for reducing the length of the transport device and consequently the size of the cock. This framework is preferably constituted by two iron bars 67 and 68, the outer ends of which are provided with a device 69 adapted for connecting them with the bands forming the framework of the device their other ends being connected one with the other by any suitable means such for example as a stud with which one of them is provided and in which a pin is engaged, or by means of any appropriate connection as shown in Fig. 7. Three positions of this inner framework are shown in Fig. 14.

What I claim and desire to secure by Letters Patent of the United States is:—

1. A stacker consisting of a framework having a flooring, walls upon said framework normally inclosing a receptacle of the shape of a haycock and means whereby a portion of the said walls may be positioned to permit of the removal of a haycock, when formed in said receptacle, substantially in its entirety.

2. A stacker consisting of a framework, walls upon said framework normally inclosing a receptacle of the shape of a haycock, means whereby a portion of the said walls may be positioned to permit of the removal of a haycock, when formed in said receptacle, substantially in its entirety, and a flooring suspended from one end of said framework and normally resting upon the other end thereof, said flooring being adapted to incline relative to the ground during removal of the haycock.

3. A stacker consisting of a framework, walls upon said framework normally inclosing a receptacle of the shape of a haycock, means whereby a portion of the said walls may be positioned to permit of the removal of a haycock, when formed in said receptacle, substantially in its entirety, a flooring suspended from one end of said framework and normally resting upon the other end thereof, said flooring being adapted to incline relative to the ground during removal of the haycock and a transverse member normally supporting said flooring and means to render said supporting member inoperative during removal of the haycock.

4. A stacker consisting of a framework, walls upon said framework normally inclosing a receptacle of the shape of a haycock, means whereby a portion of the said walls may be positioned to permit of the removal of a haycock, when formed in said receptacle, substantially in its entirety, a flooring suspended from one end of said framework and normally resting upon the other end thereof, said flooring being adapted to incline relative to the ground during removal of the haycock, and means whereby the width of said transport device may be reduced.

5. A stacker consisting of a framework having a flooring, walls upon said framework normally inclosing a receptacle of the shape of a haycock, means for varying the size of the receptacle inclosed by said walls, and means whereby a portion of the said walls may be positioned to permit of the removal of a haycock, when formed in said receptacle, substantially in its entirety.

In testimony whereof I affix my signature in presence of two witnesses.

GEORGES DE WATTRIPONT.

Witnesses:
DEAN B. MASON,
GEORGES LAURENT.

Copies of this patent may be obtained for five cents each, by addressing the "Commissioner of Patents, Washington, D. C."